United States Patent [19]

Mitsuhashi

[11] Patent Number: 5,204,795
[45] Date of Patent: Apr. 20, 1993

[54] MAGNETIC RECORDING AND REPRODUCTION SYSTEM HAVING OPPOSED MAGNETIC HEADS

[75] Inventor: Daisuke Mitsuhashi, Tokyo, Japan

[73] Assignee: Fuji Photo Film Co., Ltd., Kanagawa, Japan

[21] Appl. No.: 789,881

[22] Filed: Nov. 12, 1991

Related U.S. Application Data

[62] Division of Ser. No. 507,548, Apr. 11, 1990, Pat. No. 5,107,384.

[30] Foreign Application Priority Data

Apr. 25, 1989 [JP] Japan .................. 1-103522

[51] Int. Cl.$^5$ .................. G11B 5/48; G11B 21/16
[52] U.S. Cl. .................. 360/104; 360/102; 360/130.3
[58] Field of Search .......... 360/103, 104, 105, 99.01, 360/130.3–130.34, 97.01, 102

[56] References Cited

U.S. PATENT DOCUMENTS

| | | | |
|---|---|---|---|
| 4,803,578 | 2/1989 | Fujiwara et al. | 360/105 |
| 4,912,582 | 3/1990 | Gomi et al. | 360/99.01 |
| 4,926,274 | 5/1990 | Saitoh et al. | 360/102 |
| 4,945,436 | 7/1990 | Nagashima | 360/130.34 |
| 4,974,106 | 11/1990 | White et al. | 360/102 |
| 4,984,121 | 1/1991 | Nagashima | 360/130.34 |
| 5,047,884 | 9/1991 | Negishi et al. | 360/103 |
| 5,086,360 | 2/1992 | Smith et al. | 360/103 |

FOREIGN PATENT DOCUMENTS

| | | | |
|---|---|---|---|
| 53-29111 | 3/1978 | Japan . | |
| 57-58268 | 4/1982 | Japan . | |
| 61-224174 | 10/1986 | Japan . | |
| 62-103871 | 5/1987 | Japan | 360/130.34 |
| 63-18573 | 1/1988 | Japan . | |
| 1-204266 | 8/1989 | Japan . | |
| 2-49263 | 2/1990 | Japan . | |

*Primary Examiner*—John H. Wolff
*Attorney, Agent, or Firm*—Sughrue, Mion, Zinn, Macpeak & Seas

[57] ABSTRACT

A magnetic recording and reproduction system having magnetic heads opposing each other across a magnetic disk. The heads have shaped control portions to generate a negative pressure between the magnetic heads and the magnetic disk in association with rotation of the magnetic disk. One magnetic head is supported by an elastic member which is structured to be slightly dislocatable by the negative pressure. The magnetic heads are caused by the negative pressure to come in sliding contact with both sides of the magnetic disk, thereby obtaining positive sliding contact with extremely small contact resistance between the magnetic heads and the magnetic disk and achieving a good head contact while minimizing abrasion of the magnetic disk and the magnetic heads. The control portions to generate the negative pressure are formed integrally with the magnetic heads, thus simplifying the structure, reducing the manufacturing steps such as positioning procedures and achieving a reduction in cost.

3 Claims, 5 Drawing Sheets

MAGNETIC RECORDING AND REPRODUCTION SYSTEM HAVING OPPOSED MAGNETIC HEADS

This is a divisional of application No. 07/507,548 filed Apr. 11, 1990 now U.S. Pat. No. 5,107,384.

BACKGROUND OF THE INVENTION

This invention relates to a magnetic recording and reproduction device that enables recording and reproduction on both sides of a magnetic disk.

Heretofore, there has been a magnetic recording and reproduction device for recording and reproduction on both sides of a magnetic disk, for example, as shown in FIG. 9, which is described in detail in Japanese Patent Publication Laid-open No. 57-58268/1982.

A pair of magnetic heads 2 are disposed contactably with a magnetic disk 1, each at a respective side of the magnetic disk 1, so that individual contact points to the magnetic disk 1 are slightly separated apart from each other. Furthermore, a pair of regulating members 3 also are disposed opposing the individual magnetic heads 2 across the magnetic disk 1 to achieve a good head contact. Each individual regulating member 3 is formed integrally with each individual magnetic head 2 of the same side, forming a magnetic head member 4 having a U-shaped cross section.

Thus, these magnetic head members 4 are pressed against the individual sides of the magnetic disk 1, thereby stabilizing the head contact.

Another prior art example disclosed in Japanese Patent Publication Laid-open No. 63-18573/1988 is shown in FIG. 10.

The arrangement of this example is almost same as that of the above-described prior art example but, in this case, The individual magnetic head members 4 disposed opposing each other across the magnetic disk 1 are shifted relative to each other along the recording surface of the magnetic disk 1 (in the horizontal direction in the Figure).

By positioning the magnetic head members 4 in this manner across the magnetic disk 1, the individual magnetic heads 2 are caused to positively come in sliding contact with the respective recording surfaces of the magnetic disk positioned between the magnetic heads 2 and the regulating members 3.

However, in the prior art magnetic recording and reproduction devices as shown in FIG. 9 and FIG. 10, the positions of the regulating members 3 individually opposing the two magnetic heads 2 must be independently adjusted very exactly relative to the individual magnetic heads 2, requiring tedious and difficult adjustment.

Furthermore, in these prior art examples, the force to cause the individual magnetic heads 2 to come in sliding contact with the magnetic disk 1 is an urging force of the regulating members 3 to urge the magnetic disk 1 towards the individual magnetic heads 2. Therefore, two sets of the regulating members 3 and the magnetic heads 2 simultaneously exert a frictional force on the magnetic disk 1, which tends to make the magnetic disk difficult to rotate and cause damage or abrasion to the magnetic disk 1 and the magnetic heads 2.

OBJECT OF THE INVENTION

It is a primary object of the present invention to provide a magnetic recording and reproduction device for recording and reproduction on both sides of a magnetic disk, which is simple in structure and enables a good head contact, yet experiences suppressed abrasion of the magnetic disk and magnetic heads.

SUMMARY OF THE INVENTION

In accordance with the present invention which attains the above object, there is provided a magnetic recording and reproduction device comprising a first magnetic head disposed at a predetermined distance from a free rotary surface plane of a magnetic disk and opposing one recording surface of the magnetic disk, a second magnetic head disposed opposing the first magnetic head across the magnetic disk, supporting means for supporting the second magnetic head detachably in contact with the other recording surface of the magnetic disk, an elastic member disposed between the second magnetic head and the supporting means and capable of providing a fine control movement of the position of the second magnetic head relative to the magnetic disk, and control portions formed individually on the first and second magnetic heads for generating a negative pressure between the control portions and the magnetic disk in association with rotation of the magnetic disk to cause the individual recording surfaces of the magnetic disk to come in sliding contact with the individual first and second magnetic heads.

One recording surface of the magnetic disk is positioned in the vicinity of the first magnetic head disposed at a predetermined distance from the free rotary surface plane of the magnetic disk, and the second magnetic head supported by the supporting means is brought closer to the other recording surface of the magnetic disk.

In association with rotation of the magnetic disk, a negative pressure is generated between the control portion formed on the first magnetic head and one recording surface of the magnetic disk which opposes the first magnetic head, to attract the magnetic disk toward the first magnetic head and to cause the magnetic disk to come in sliding contact with the first magnetic head, thereby enabling recording and reproduction on the one recording surface.

At the same time, a negative pressure is also generated between the control portion formed on the second magnetic head and the opposing other recording surface of the magnetic disk. As a result, the elastic member disposed between the second magnetic head and the supporting means is deformed to protrude toward the magnetic head side so that the second magnetic head comes in sliding contact with the magnetic disk, thereby enabling recording and reproduction on the other recording surface of the magnetic disk.

Thus, a good head contact with the individual sides of the magnetic disk and small contact resistance is achieved by the relatively simple arrangement.

DESCRIPTION OF THE PREFERRED EMBODIMENTS

A preferred embodiment of the inventive magnetic recording and reproduction device will now be described in detail with reference to the drawings.

Figure 1:
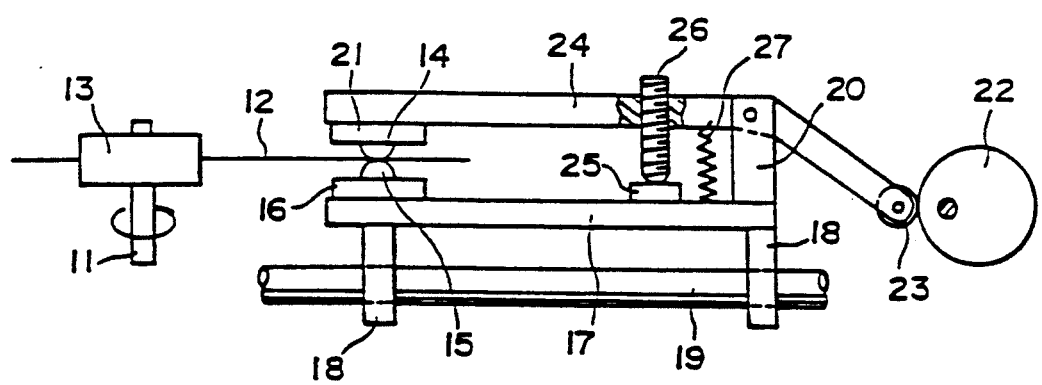
FIG. 1 and FIG. 2 are schematic side views showing an embodiment of the inventive magnetic recording and reproduction device.

As shown in FIG. 1, a center hub 13 which is concentrically and integrally disposed at the center of a magnetic disk 12 is put on a drive shaft 11 of a motor. Magnetic heads 14 and 15 are individually disposed at the upper side and lower side of the magnetic disk 12, and front ends of the magnetic heads 14 and 15 are in sliding contact with the magnetic disk 12.

The magnetic head 15 is mounted to a base plate 17 through a supporting member 16. The base plate 17 is slidably supported by a guide bar 19, which penetrates a pair of protrusions 18 in the horizontal direction in FIG. 1, the protrusions extending from the bottom surface of the base plate 17. As the base plate 17 moves along the guide bar 19, the pair of magnetic heads 14 and 15 are moved in the radial direction of the magnetic disk 12 to change the track.

Also extending from the base plate 17, at its right side in its FIG. 1, is a vertically protruding supporting plate 20. At the extended end of the supporting plate 20 is rotatably supported an intermediate point of an arm 24. The arm 24 is provided at one end with the magnetic head 14 through a supporting member 21 and at the other end with a roller 23 rolling on the periphery of a cam 22.

Positioned between the supporting plate 20 and the magnetic head 14, the arm 24 is provided with an adjusting screw 26 vertically penetrating and threaded with the arm 24. The adjusting screw 26 contacts at its lower end a positioning plate 25 formed on the base plate 17 for positioning the the magnetic head 14.

Figure 2:
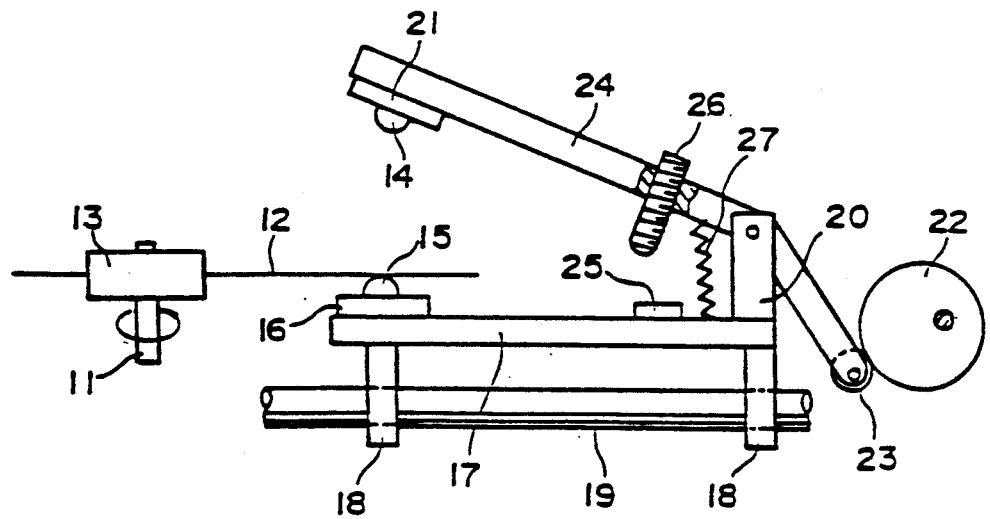

As shown in FIG. 2, as the cam 22 rotates, the roller 23 rolls on its periphery to push down the other end of the arm 24 and raise one end, moving the magnetic head 14 away from the recording surface of the magnetic disk 12. The magnetic disk 12 can be replaced at this time.

Furthermore, a tension spring 27 is disposed between the arm 24 and the base plate 17 located between the supporting plate 20 and the magnetic head 14. The tension spring 27 gives an urging force to cause the arm 24, which has been brought away from the magnetic disk 12 as shown in FIG. 2, to come in sliding contact with the magnetic disk 12 as shown in FIG. 1.

Figure 3:
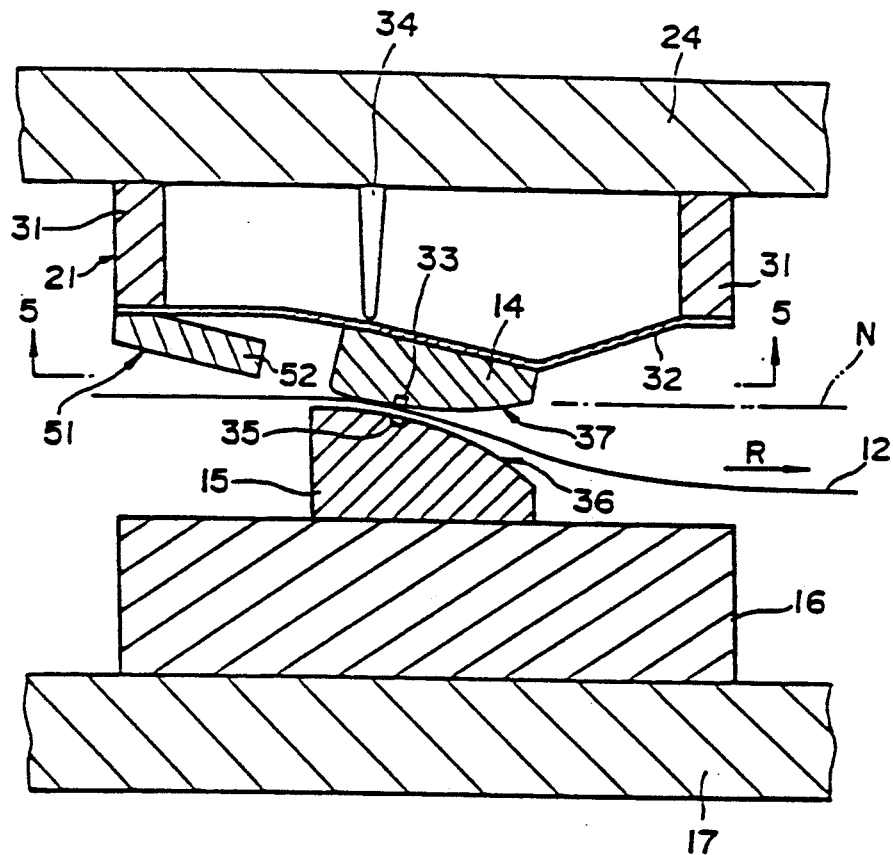
FIG. 3 is a schematic cross sectional view of a magnetic head.

The supporting members 21 and 16 thus provided with the magnetic heads 14 and 15 will be described in detail. Referring to FIG. 3 which is a cross sectional view in the vicinity of the supporting members 21 and 16, a pair of mounting plates 31 are protrudingly disposed at a predetermined interval on the lower surface of the arm 24. Between the pair of mounting plates 31 is provided a vertically deformable thin elastic plate or gimbal spring plate 32 fixed to the individual mounting plates 31. To the lower surface of the elastic plate 32 is mounted the magnetic head 14, having a magnetic gap 33 formed on the head surface opposing the magnetic disk 12.

On the lower surface of the arm 24 between the mounting plates 31 is protrudingly provided a positioning pin 34 which contacts the magnetic head 14 dislocatably supported by the elastic plate 32 to prevent the magnetic head 14 from further withdrawing and to properly position the magnetic head 14.

The supporting member 16 mounted to the upper surface of the base plate 17 is a flat plate-formed member. To the upper surface of the supporting member 16 is mounted the magnetic head 15, having a magnetic gap 35 formed on the head surface opposing the magnetic disk 12.

On the individual surfaces opposing the magnetic disk 12 of the magnetic heads 15 and 14 supported on the supporting members 16 and 21 are formed inclined surfaces 36 and 37 which are formed so that the surfaces become more distant from the free rotary surface plane N of the magnetic disk 12 in the rotational direction (arrow R) of the magnetic disk 12. As a result, in association with rotation of the magnetic disk 12, a negative pressure is generated between the magnetic disk 12 and the inclined surfaces 36 and 37 which generates an attractive force.

The mounting plate 31 is provided with a positive pressure generating type auxiliary plate 52, having an inclined surface 51 formed on the surface opposing the magnetic disk 12, which is inclined so as to become gradually closer to the free rotary surface plane N in the rotational direction of the magnetic disk 12. As the magnetic disk 12 rotates, a positive pressure is generated between the auxiliary plate 52 and the magnetic disk 12, which acts to push the magnetic disk 12 towards the magnetic head 15 side.

Figure 4:
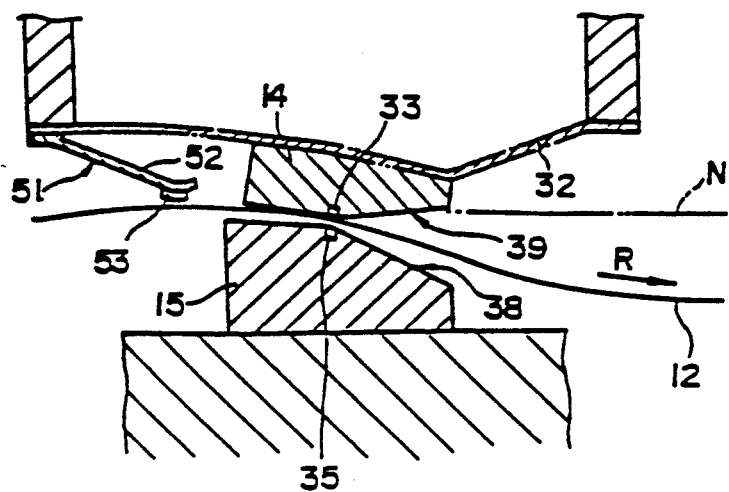
FIG. 4 is a schematic cross sectional view of another embodiment of the magnetic head.

Alternatively, as shown in FIG. 4, inclined surfaces 38 and 39, formed to become more distant from the free rotary surface plane N of the magnetic disk 12 in the rotational direction (arrow R) of the magnetic disk 12 and differing in inclination angle between the individual sides of the magnetic gaps 33 and 35, may be formed on the individual surfaces of the magnetic heads 15 and 14 opposing the magnetic disk 12. In this example, the auxiliary plate 52 shown in FIG. 3 is made of a plate spring, of which the surface opposing the magnetic disk 12 is provided with the inclined surface 51 described with reference to FIG. 3.

Thus, as the magnetic disk 12 rotates, a positive pressure is generated between the magnetic disk 12 and the inclined surface 51, and the magnetic disk 12 can be pushed by the positive pressure towards the magnetic head 15 side and is also urged by the urging force of the plate spring to the magnetic head 15 side. Therefore, the front end of the plate spring is provided with a pad 53 comprising felt or the like to prevent the magnetic disk 12 from being damaged when the front end comes in contact with the magnetic disk 12. Naturally, the auxiliary plate 52 as shown in FIG. 3 may be used in place of the plate spring.

The free rotary surface plane N used in this Specification refers to the position of the recording surface of the magnetic disk 12 which is rotating with no external forces other than a rotary driving force.

As the magnetic disk 12 rotates, a negative pressure is generated between the inclined curved surface 36 or the inclined flat surface 38 of the magnetic head 15, mounted to the supporting member 16, and the magnetic disk 12 to attract the magnetic disk 12 toward the magnetic head 15 side. At the same time, a negative pressure is also generated between the inclined curved surface 37 or the inclined flat surface 39 of the magnetic head 14, supported by the elastic plate 32, and the magnetic disk 12. As a result, the magnetic head 14 tends to protrude toward the magnetic disk 12, causing a deforming of the elastic plate 32 towards the magnetic disk 12, and the disk is attracted toward the magnetic head 15 by a stronger negative pressure.

At the same time, the auxiliary plate 52 generates a positive pressure between the auxiliary plate 52 and the magnetic disk 12 to push the magnetic disk 12 towards the magnetic head 15 side, thereby promoting even further the above-described actions. Thus, the individual magnetic gaps 35 and 33 of the magnetic heads 15 and 14, respectively, are in sliding contact with the individual recording surfaces of the magnetic disk 12 which rotates between the magnetic gaps 35 and 33, thus achieving a good head contact to conduct satisfactory recording and reproduction on both sides of the magnetic disk 12.

Figure 5:
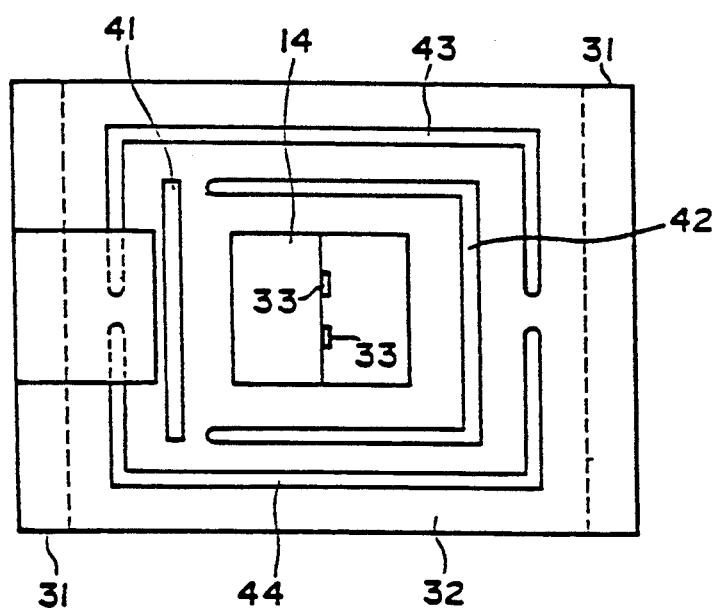
FIG. 5 is a schematic view taken along line 5—5 in FIG. 3.

The elastic plate 32 which achieves minute dislocation, mainly in a direction normal to the free rotary surface plane, is arranged, for example, as follows. As shown in FIG. 5 which is taken along line 5—5 in FIG. 3, the elastic plate 32 is provided with a hole 41 at the left side of the magnetic head 14 disposed at the center of the elastic plate 32, and also with a hole 42 which surrounds the remaining peripheral portions of the sides of the magnetic head 14. At the outside of these holes 41 and 42 are provided U-shaped holes 43 and 44, symmetrically surrounding the magnetic head 14 from the upper and lower sides.

Therefore, as shown in FIG. 3, when the magnetic head 14 disposed on the elastic plate 32 is applied with a force exerted at the upper side in the figure by a negative pressure, the magnetic head 14 is moved so as to protrude downward while inclining about the left end in the figure of the magnetic head 14, rather than a parallel movement, in order to achieve a better head contact.

Figure 6:
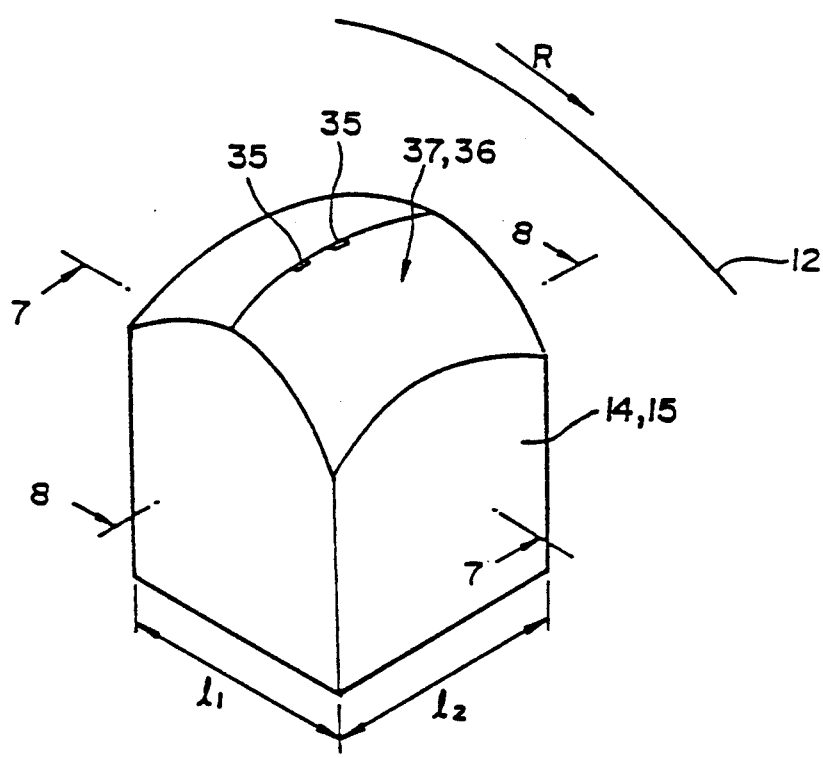
FIG. 6 is a schematic perspective view of a magnetic head.
Figure 7:
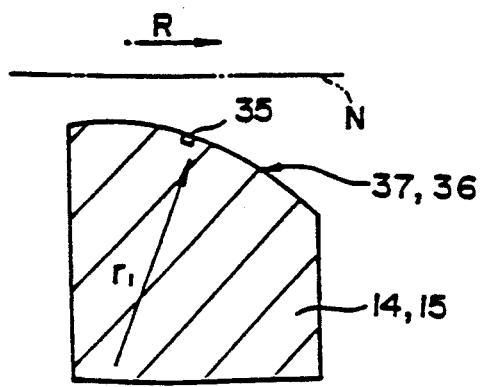
FIG. 7 and FIG. 8 are respectively schematic views taken along lines 7—7 and 8—8 in FIG. 6.

FIG. 6 is a schematic perspective view showing the magnetic heads 14 and 15 used in the embodiment which have been described previously, and FIG. 7 is a schematic cross sectional view of the magnetic heads 14 and 15 taken along line 7-7 in FIG. 6, that is, along the rotational direction (arrow R) of the magnetic disk 12. As shown in these figures, the curved surfaces 37 and 36, as described in the embodiment, are inclined so as to gradually become distant from the free rotary surface plane N in the rotational direction of the magnetic disk 12, for example, with a curvature radius $r_1$.

Figure 8:
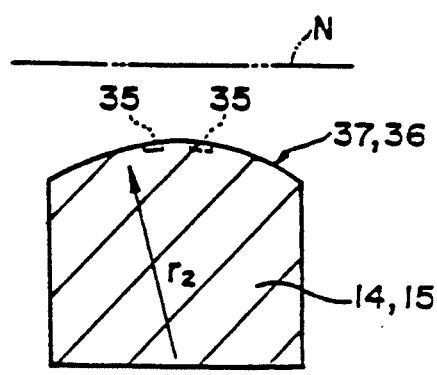
Figure 9:
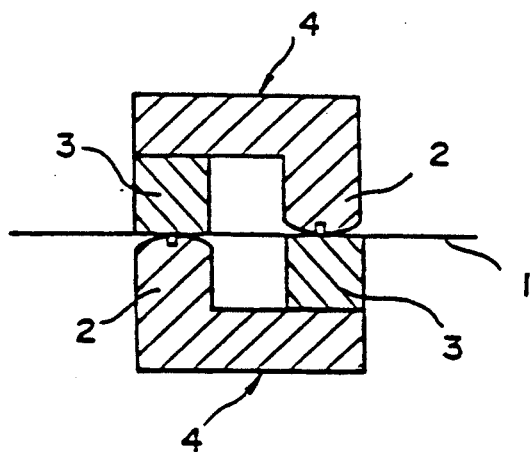
FIG. 9 and FIG. 10 are schematic cross sectional views of prior art magnetic recording and reproduction devices.
Figure 10:
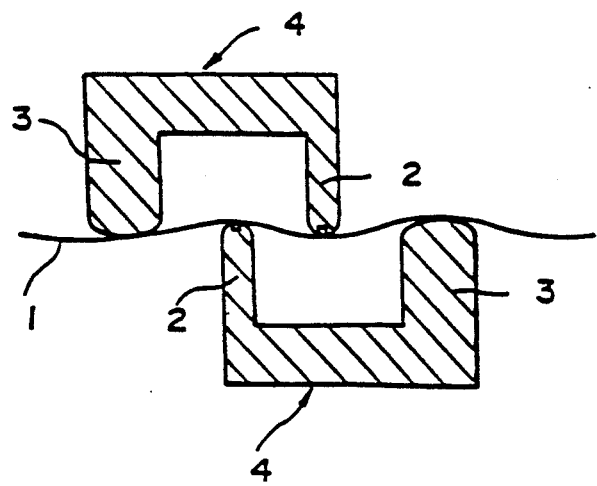

FIG. 8 is a schematic cross sectional view showing the magnetic heads 14 and 15 taken along line 8—8 in FIG. 6, that is, along the radial direction of the magnetic disk 12. As shown in FIG. 8, the inclined curved surfaces 37 and 36 of the magnetic heads 14 and 15 are inclined so that the magnetic gap 35 is at the top in the cross sectional plane along the radial direction of the magnetic disk 12, for example, with a curvature radius $r_2$.

Therefore, the inclined curved surfaces 37 and 36 of the magnetic heads 14 and 15 are nearly spherical curved surfaces with the magnetic gap 35 at the top. When $r_1$ and $r_2$ are set to be nearly equal to each other, the curvature radii may be, for example, approximately 50 to 150 mm. Of course, $r_1$ and $r_2$ may alternatively be different, for example, so that the cross sectional front edges of the magnetic heads 14 and 15 taken along the radial direction of the magnetic disk 12 are straight, that is, $r_2 = \infty$.

Alternatively, the above-described inclined curved surfaces 37 and 36 or the inclined flat surfaces 39 and 38 are provided with grooves along the rotational direction of the magnetic disk 12 to regulate the air flow and promote the generation of negative pressure. In short, control portions which generate negative pressures between the magnetic disk 12 and the control portions in association with high-speed rotation of the magnetic disk 12 to attract the magnetic disk 12, may be formed on the surfaces of the magnetic heads 14 and 15 opposing the magnetic disk 12.

The magnetic heads 14 and 15 thus provided with the negative pressure generating control portions may have such dimensions as shown in FIG. 6 in which, for the magnetic head 15 which is required to generate a higher negative pressure, $l_1$ is at least about 1.5 mm and $l_2$ is at least about 1.5 mm, where $l_1$ is the length of a side along the rotational direction of the magnetic disk 12 and $l_2$ is the length of a side nearly perpendicular to the rotational direction. With such dimensions, the magnetic head 15 can generate a sufficient negative pressure. For the magnetic head 14 which is slightly dislocatable, for example, $l_1$ may be at least about 170 $\mu$m and $l_2$ may be at least about 280 $\mu$m.

In this embodiment the elastic plate 32 comprises a so-called gimbal spring plate. However, the elastic plate 32 may alternatively be formed from a thin-plate-formed rubbery elastic material, and any other materials that are slightly deformable by a negative pressure may be used.

Furthermore, the shapes and arrangements of the arm 24 and the cam 22 to detachably support the magnetic head 14 relative to the magnetic disk 12 are not restricted to this embodiment. For example, the surface of the cam 22 sliding with the roller 23 may be formed so that the vertical approaching speed to the magnetic disk 12 of the arm 24 in association with the rotation of the cam 22 is sufficiently small immediately before contacting the magnetic disk 12.

What is claimed is:

1. A magnetic record playback device, operable with a magnetic disk having opposite recording surfaces and being rotatable in a free rotary surface plane, comprising:

a first, lower magnetic head disposed at a predetermined position with respect to the free rotary surface plane of said magnetic disk and opposing one recording surface of said magnetic disk;

a second, upper magnetic head disposed opposing said first, lower magnetic head across said magnetic disk;

a gimbal spring for supporting said second, upper magnetic head, said gimbal spring comprising an elastic member which deforms toward said magnetic disk so that said second, upper magnetic head contacts said magnetic disk while preventing said second, upper magnetic head from crushing said first, lower magnetic head during playback of said magnetic disk; and control portions formed individually on said first, lower and second, upper magnetic heads for generating a negative pressure between said respective control portions and said magnetic disk in association with rotation of said magnetic disk, wherein said negative pressure occurring at said first, lower magnetic head is greater than said negative pressure occurring at said second, upper magnetic head.

2. The magnetic record playback device according to claim 1, wherein said control portions, formed individually on said first, lower and second, upper magnetic heads, include respective areas which are asymmetrical with respect to each other for generating said negative pressure.

3. A method for playback of a magnetic disk, wherein a first, lower magnetic head including a control portion is positioned at a predetermined position with respect to a free rotary surface plane of the magnetic disk, and a second, upper magnetic head including a control portion is disposed opposing said first, lower magnetic head across the magnetic disk, and further wherein a negative pressure occurring at the control portion of said first, lower magnetic head is greater than a negative pressure occurring at the control portion of said second, upper magnetic head during rotation of the magnetic disk, the method comprising the steps of:

(a) attracting and contacting the magnetic disk on said first, lower magnetic head by the negative pressure occurring between the magnetic disk and the control portion of said first, lower magnetic head while rotating the magnetic disk;

(b) supporting said second, upper magnetic head by a gimbal spring, said gimbal spring comprising an elastic member which deforms toward the magnetic disk so that said second, upper magnetic head contacts the magnetic disk while preventing said second, upper magnetic head from crushing the first, lower magnetic head during playback of the magnetic disk; and (c) protruding said second, upper magnetic head to the predetermined position by virtue of the deformation of said gimbal spring in response to the negative pressure occurring between the magnetic disk and the control portion of said second, upper magnetic head during rotation of the magnetic disk, so as to contact the magnetic disk.

* * * * *